US 6,415,159 B1

(12) United States Patent
Miyashita

(10) Patent No.: US 6,415,159 B1
(45) Date of Patent: Jul. 2, 2002

(54) BAND SELECTION METHOD FOR DUAL-BAND MOBILE PHONE AND MOBILE PHONE USING THE SAME METHOD

(75) Inventor: Tsutomu Miyashita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/351,471

(22) Filed: Jul. 13, 1999

(30) Foreign Application Priority Data

Jul. 13, 1998 (JP) ............................................ 10-197377

(51) Int. Cl.[7] ................................................. H04B 1/38
(52) U.S. Cl. ........................ 455/558; 455/552; 455/553; 455/426; 379/357
(58) Field of Search .................................. 455/422, 426, 455/454, 550, 551, 552, 553, 557, 558, 575; 379/357, 356

(56) References Cited

U.S. PATENT DOCUMENTS 5,694,414 A  12/1997  Smith et al.
5,710,986 A   1/1998  Obayashi et al.
6,125,283 A * 9/2000  Kolev et al. ................ 455/552
6,223,052 B1 * 4/2001  Ali Vehmas et al. ....... 455/551

FOREIGN PATENT DOCUMENTS

EP        1 503 151 A2    12/1991
EP        0 570 145 A1     5/1993
WO        WO 98/09462      3/1998

* cited by examiner

Primary Examiner—Doris H. To
(74) Attorney, Agent, or Firm—Scully, Scott, Murphy & Presser

(57) ABSTRACT

This invention intends to provide a method capable of automatically selecting one system without a large increase of production cost in a dual band mobile phone of this invention having both PHS and GSM functions. First, a common control unit (40) retrieves whether or not a SIM card (19) is mounted on a card mounting unit (9) by a SIM card retrieval circuit (41). Next, if the mounting thereof is detected and storage data is read properly from the SIM card (19), the GSM function is indicated on a mode lamp (17) so that communication is carried out by an operation of the GSM mode. On the other hand, if the mounting of the SIM card (19) cannot be detected or data cannot be read from the SIM card (19), the PHS mode is set up by a mode setting circuit (43) instead of the GSM mode. Then, the PHS mode is indicated on the mode lamp (17) so that communication is carried out by an operation of the PHS mode. A mode set to be operating is memorized in a mode memory (13) and if the power is turned ON, the system starts to operate at this memorized mode.

2 Claims, 4 Drawing Sheets

BAND SELECTION METHOD FOR DUAL-BAND MOBILE PHONE AND MOBILE PHONE USING THE SAME METHOD

BACKGROUND OF THE INVENTION

1. Field of the Invention

The present invention relates to a band selection method for a dual-band mobile phone having both the functions of a system requiring SIM (subscriber identification module) card, for example, GSM (Global System for Mobile communication) and a system not requiring the SIM card, for example, PHS (personal handy-phone system) and capable of automatically selecting and operating any one of the two systems without inducing an increase in size of the unit structure, and a mobile phone using the same method.

2. Description of the Related Art

Recently, a dual band mobile phone system capable of using different communication systems or different frequency bands with a single mobile phone unit has been developed.

Conventionally, in this kind of band selection method for a dual band mobile phone and its apparatus, user can automatically or manually select a system considered optimum depending on a communication enabled area, busy state of communication lines, communication fee and the like of each system.

For example, a dual band mobile phone having GSM used world wide mainly in Europe and PHS used in mainly Japan and Asia has been developed to a practical use level.

The features of the GSM are use of a frequency band of 900 MHz and a memory card for storing subscriber information, which is called SIM card. The SIM card contains user telephone numbers, accounting information and the like, and if this SIM card is not used, the GSM terminal cannot be used. Although, for the GSM, its cell area is wide because of a large output, it is not capable of communicating underground because no radio network has not been prepared yet and its communication fee is higher than others.

On the other hand, it is the feature of the PHS that frequency band of 1.9 GHz is used, its transmission output power is as small as 10 mW on average, an area which electromagnetic wave can reach is 100 m in radius from a base station, and therefore, this is suitable for a small cell type mobile phone system. Therefore, because the base station can be installed easily at a low cost although the service area is limited to a small area, it allows communication underground if a base station is installed, and further communication fee is cheap.

To solve those problems, a dual band mobile phone suitable for both the systems has been developed.

Conventionally, in this kind of the dual band mobile phone, user must select a system for use. For example, the mobile phone is provided with a mode setting key and by operating this key manually, a system for use is selected. Further, there is a method in which a system for use is automatically selected by incorporating a RSSI (Received Signal Strength Indication) measuring circuit in a common control unit of a mobile phone. In this case, a field intensity level is measured according to a control channel signal received from a base station of each system.

Of the above-described conventional band selection methods for dual band mobile phone, in case where user manually selects a system for use, there is a problem that user's selection of system is complicated. The reason is that the user must select a system considered optimum depending on the communication enabled area of each system, busy state of the line, communication fee and the like.

In case of automatically selecting a system for use by measuring of the RSSI, there is a problem that the size of the mobile phone is enlarged and production cost is also increased. In any case, when the GSM requiring the SIM card is selected, if the SIM card is not loaded, there occurs such a problem that communication cannot be started while an error message is displayed on a character display.

SUMMARY OF THE INVENTION

The present invention has been made to solve the above problems and therefore it is an object of the invention to provide a band selection method for dual band mobile phone which allows automatic selection of system for use without inducing a large increase of production cost and a mobile phone using the same method.

To achieve the above object, the present invention provides a band selection method for dual band mobile phone, having both a first system requiring a SIM card and a second system not requiring the same. This band selection method comprises: detecting whether or not the SIM card is mounted while an operating mode is regarded as a system mode of the first system when a power switch is turned on; and setting the operating mode to a system mode of the first system when the SIM card is detected, while if the SIM card is not detected, setting the operating mode to a system mode of the second system. Therefore, user can use the mobile phone without making consciousness of presence/absence of the SIM card.

In addition to the above, the dual band mobile phone of the present invention includes a mode memory for memorizing a system mode of any one of the two systems. The band selection method comprises: retrieving a system mode memorized in the mode memory when the power switch is turned on, retrieving the SIM card when a system mode of the first system is detected, and setting the operating mode to a system mode of the first system when the SIM card is detected. Further, either when a system mode of the second system is detected as a result of retrieval of the mode memory or when it is detected that the SIM card is not mounted as a result of retrieval of the SIM card, the system mode of the second system is set up. Therefore, because the mobile phone may start the functional operation of the system memorized in the mode memory, the starting operation carried out when the power is turned on can be simplified.

A dual band mobile phone using the above-mentioned method has both a first system requiring a SIM card and a second system not requiring the same. And the dual band mobile phone comprises a card mounting unit for mounting the SIM card, a power switch for supplying a battery power to a predetermined circuit and a common control unit. This common control unit includes an SIM card retrieval circuit and a mode setting circuit. The SIM card retrieval circuit is provided for retrieving the SIM card at the card mounting unit while an operating mode is regarded as a system mode of the first system when the power switch is turned on. And the mode setting circuit is provided for setting the operating mode to a system mode of the first system when the SIM card retrieval circuit detects the SIM card, or setting the operating mode to a system mode of the second system if the SIM card is not detected.

The above dual band mobile phone further comprises a mode memory for memorizing any one system mode of the two systems and a mode detection circuit included in a common control unit. The mode detection circuit is provided for detecting a system mode stored in the mode memory when the power switch is turned on. The above-described SIM card retrieval circuit retrieves the SIM card at the card mounting unit when this mode detection circuit detects a system mode of the first system.

The mode setting circuit of the common control unit may set the system mode of the second system either when the mode detection circuit detects the system mode of the second system or when the SIM card retrieval circuit detects that the SIM card is not mounted.

The aforementioned mode memory is capable of memorizing a system mode operating when the power switch is turned off. Therefore, in continuous calls, a new call is capable of selecting a system of the same condition as the last call, thereby enabling a stabilized communication. Further, it is also possible to provide with a display unit for indicating a system mode set by the common control unit by at least one of characters and a lamp. Therefore, an operating system on use can be recognized.

DESCRIPTION OF THE PREFERRED EMBODIMENTS

Next, the embodiment of the present invention will be described with reference to the accompanying drawings.

Figure 1:
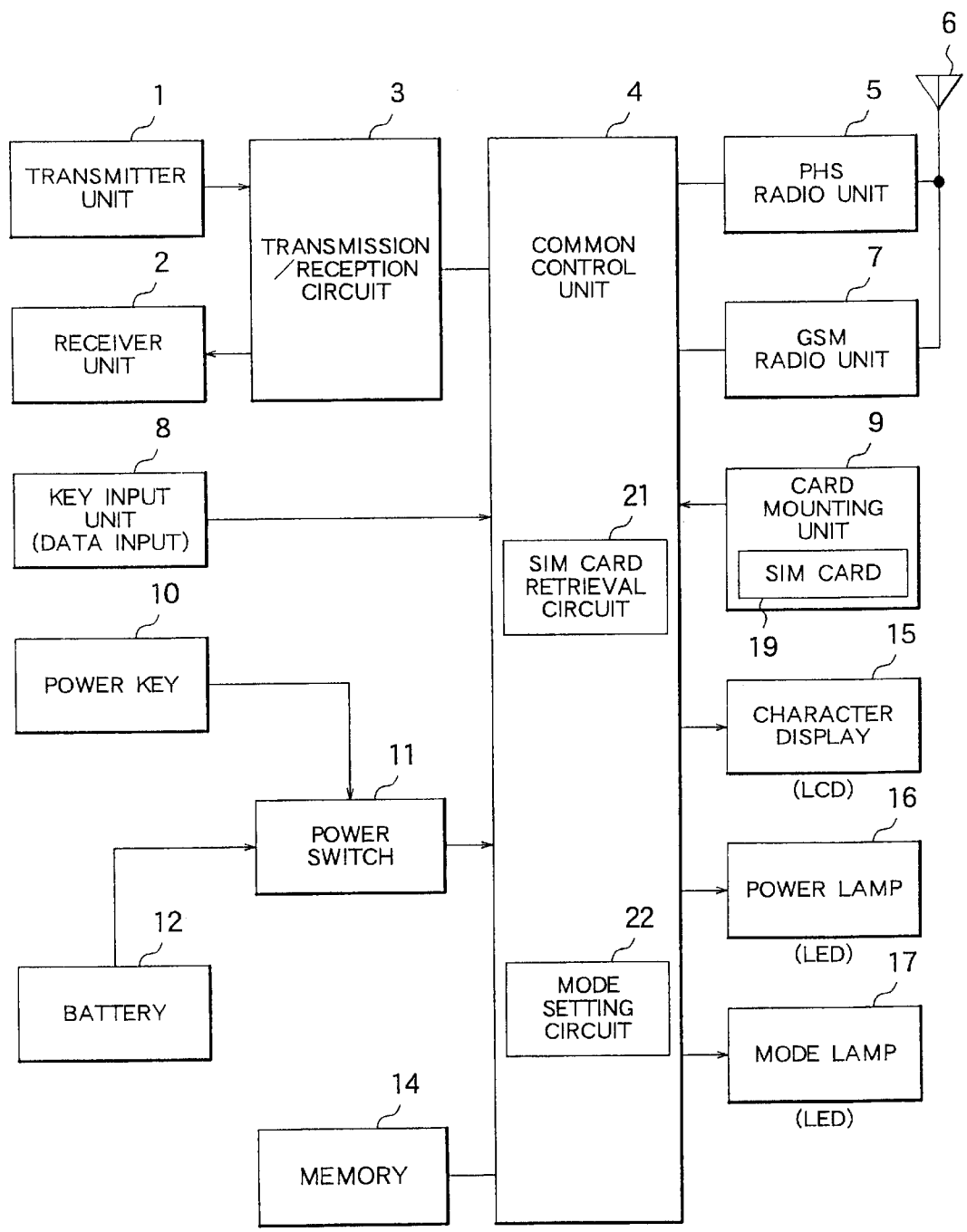
FIG. 1 is a block diagram showing an embodiment of the present invention for satisfying the fundamental condition thereof.

FIG. 1 is a functional block diagram showing an embodiment of the present invention for satisfying the fundamental condition thereof. In the dual band mobile phone shown in FIG. 1, the aforementioned first system is GSM and the second system is PHS.

A dual band mobile phone shown in FIG. 1 comprises a transmitter unit 1, a receiver unit 2, a transmission/reception circuit 3, a common control unit 4, a PHS radio unit 5, an antenna 6, a GSM radio unit 7, a key input unit 8, a card mounting unit 9, a power key 10, a power switch 11, a battery 12, a memory 14, a character display 15, a power lamp 16, and a mode lamp 17.

The transmitter unit 1, receiver unit 2 and transmission/reception circuit 3 are used in ordinary telephone systems. The common control unit 4 controls all functions of the mobile phone and specifically has a SIM card retrieval circuit 21 and a mode setting circuit 22 relating to the present invention. The antenna 6 is connected to the GSM radio unit 7 as well as the PHS radio unit 5 so that it is capable of communicating with respective base stations via radio. The PHS radio unit 5 is available when the PHS is selected by the common control unit 4. The GSM radio unit 7 is available when the GSM is selected by the common control unit 4. The key input unit 8 is a key pad or board for inputting a dial number and data.

The card mounting unit 9 is a portion on which the SIM card 19 for use in GSM is to be mounted. If it is so constructed that the SIM card is inserted, when the card is mounted properly by inserting the card, card mounting information is transmitted via a predetermined position. When the SIM card 19 is mounted, data such as subscriber number and accounting information memorized in the SIM card can be read by the common control unit 4.

If the power key 10 is turned ON, the power switch 11 is controlled so as to supply power of the battery 12 to respective portions of the mobile phone. When power is supplied to the common control unit 4, the power lamp 16 is lit.

The memory 14 stores software to be executed by the common control unit 4 and data. The character display 15 displays such predetermined information as input information and operating condition information via LCD (liquid crystal display) in characters. The power lamp 16 is lit via LED (light emitting diode) when the power switch 11 is turned ON. The mode lamp 17 is controlled by the common control unit 4 so as to indicate an operating system via lighting of the LED. For example, the mode lamp 17 is lit when the PHS is activated and unlit when the GSM is activated, so that an operating system can be indicated with a single LED.

Figure 2:
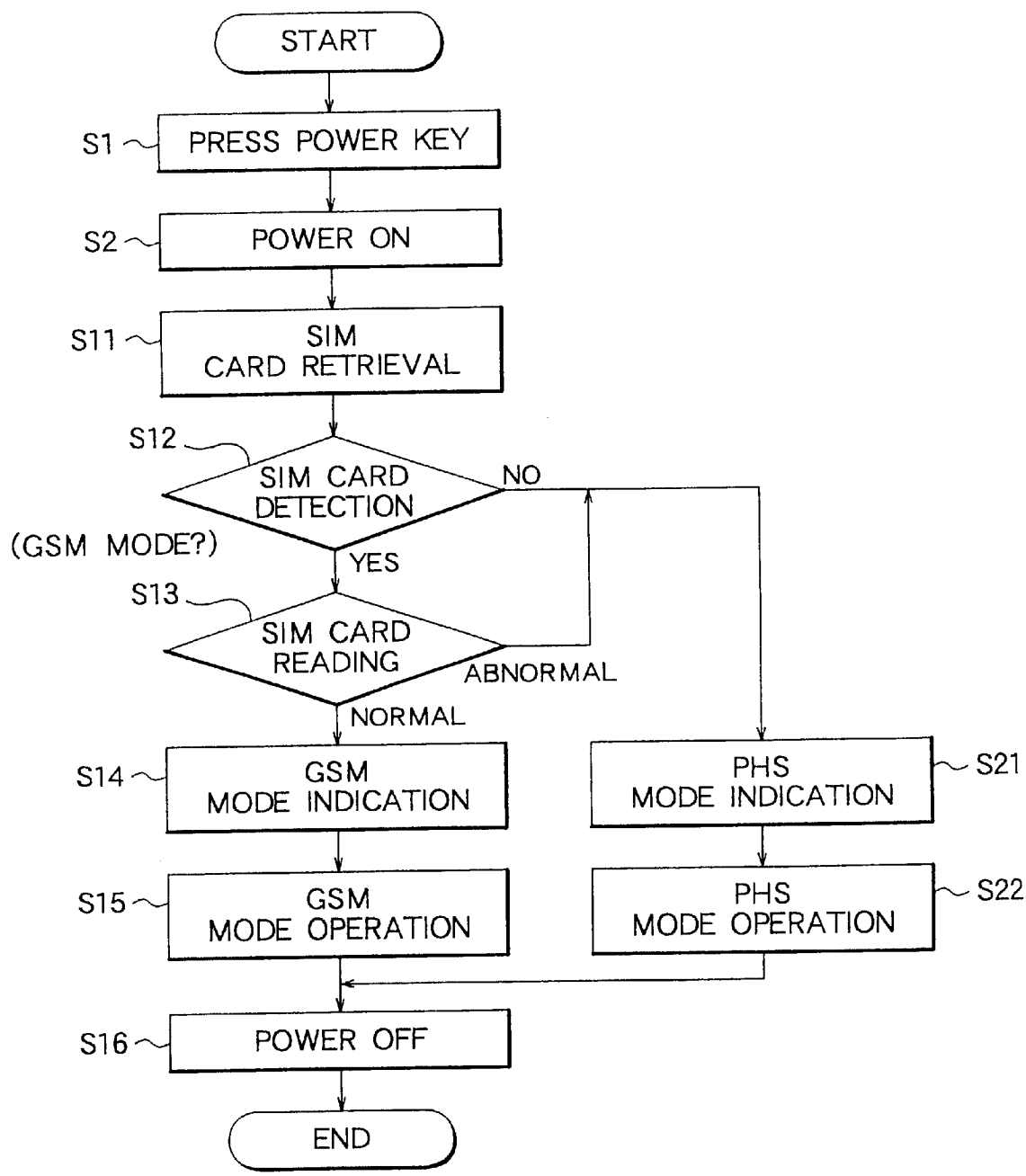
FIG. 2 is a flow chart showing an example of main operating procedure corresponding to FIG. 1.

An operation under the fundamental condition for system selection will be described with reference to FIGS. 1 and 2.

If the power key 10 is pressed (step S1), the power switch 11 is turned ON (step S2) so that power of the battery 12 is supplied to respective portions thereby starting the operation.

In the common control unit 4, first, whether or not the SIM card 19 is mounted on the card mounting unit 9 is checked by the SIM card retrieval circuit 21 (step S11).

As a result of this retrieval, if it is detected that the SIM card 19 is mounted (YES in step S12), the common control unit 4 judges normality of storage data in the SIM card 19 by reading thereof (step S13).

If the procedure of this step S13 is "normal" so that the storage data can be read normally, the common control unit 4 sets the GSM mode by the mode setting circuit 22. And the common control unit 4 keeps the mode lamp 17 unlit to indicate GSM mode ON and further the GSM mode is indicated in characters on the character display 15 (step S14).

Next, the common control unit 4 communicates through the GSM radio unit 7 by the operation of the GSM mode (step S15). If communication ends and the power key 10 is turned OFF (step S16), the procedure is terminated.

On the other hand, if the step S12 is "NO" or the step S13 is "ABNORMAL", the common control unit 4 turns ON the mode lamp 17 by the mode setting circuit 22 so as to indicate PHS mode and further the PHS mode is indicated in characters on the character display 15 (step S21).

If the above step S12 is "NO" the "PHS mode" is indicated in characters on the character display 15. However, if the above step S13 is "ABNORMAL", the "PHS mode" and "SIM card abnormal" are indicated in characters on the character display 15.

Next, the common control unit 4 communicates through the PHS radio unit 5 by an operation of the PHS mode (step S22). If the communication is terminated, the processing proceeds to step S16, in which the power key 10 is turned OFF so as to terminate the procedure.

Figure 3:
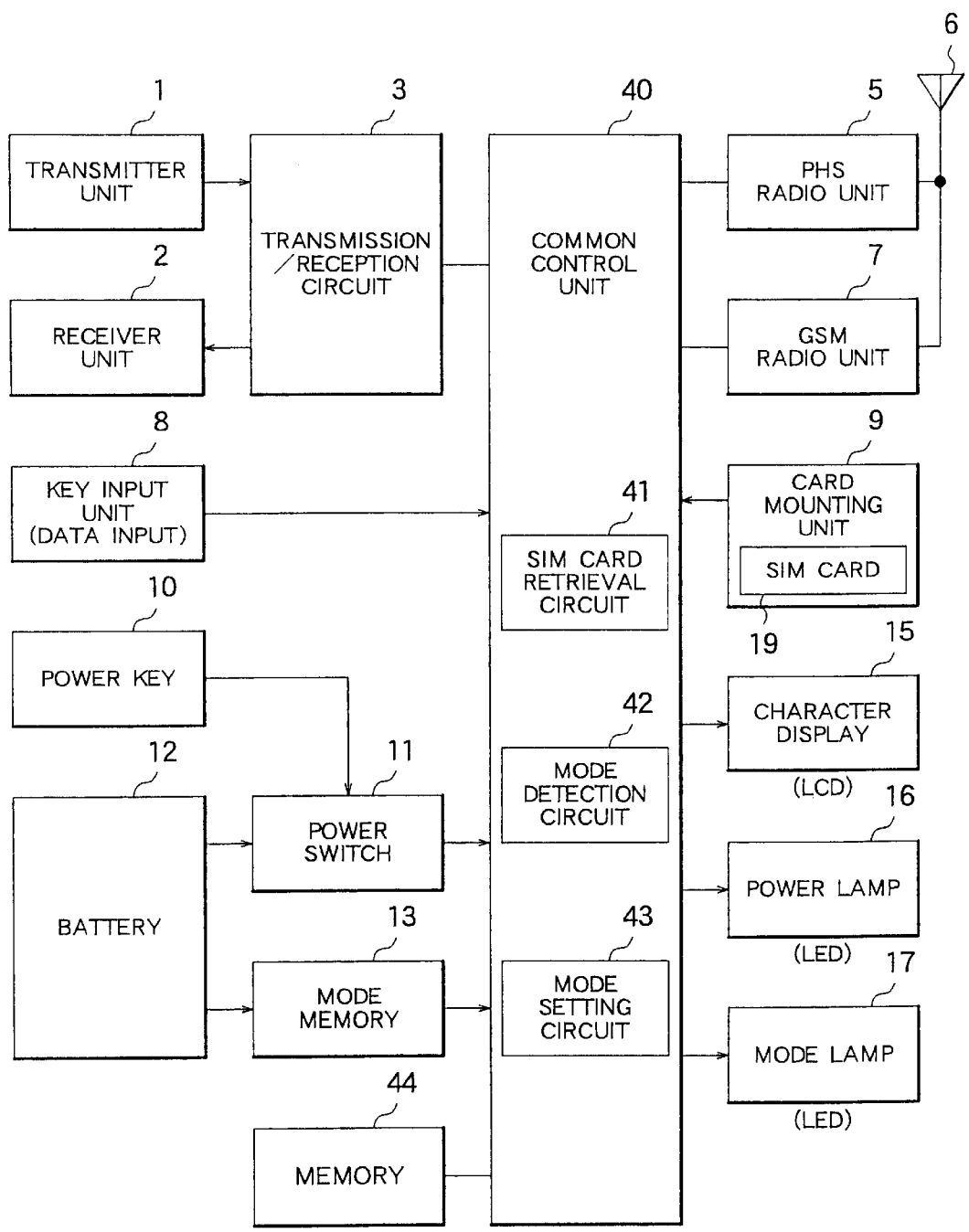
FIG. 3 is a functional block diagram showing other embodiment of the present invention than FIG. 1.

Other embodiments of the present invention will be described with reference to FIGS. 3, 4. In FIG. 3, the same reference numerals are attached to the same components as FIG. 1 and a description thereof is omitted.

FIG. 3 is different from FIG. 1 in that the mode memory 13 is added and a mode detection circuit 42 is added to a common control unit 40. Therefore, although the SIM card retrieval circuit 41 of the common control unit 40 is the same as conventional, main functions are the same in the memory 44 and the mode setting circuit 43 of the common control unit 40, however, details thereof are different as described below.

That is, first, if the power key 10 is pressed (step S1) and the power switch 11 is turned ON (step S2), power of the battery 12 is supplied to respective portions of the mobile phone so that operation thereof is started.

Figure 4:
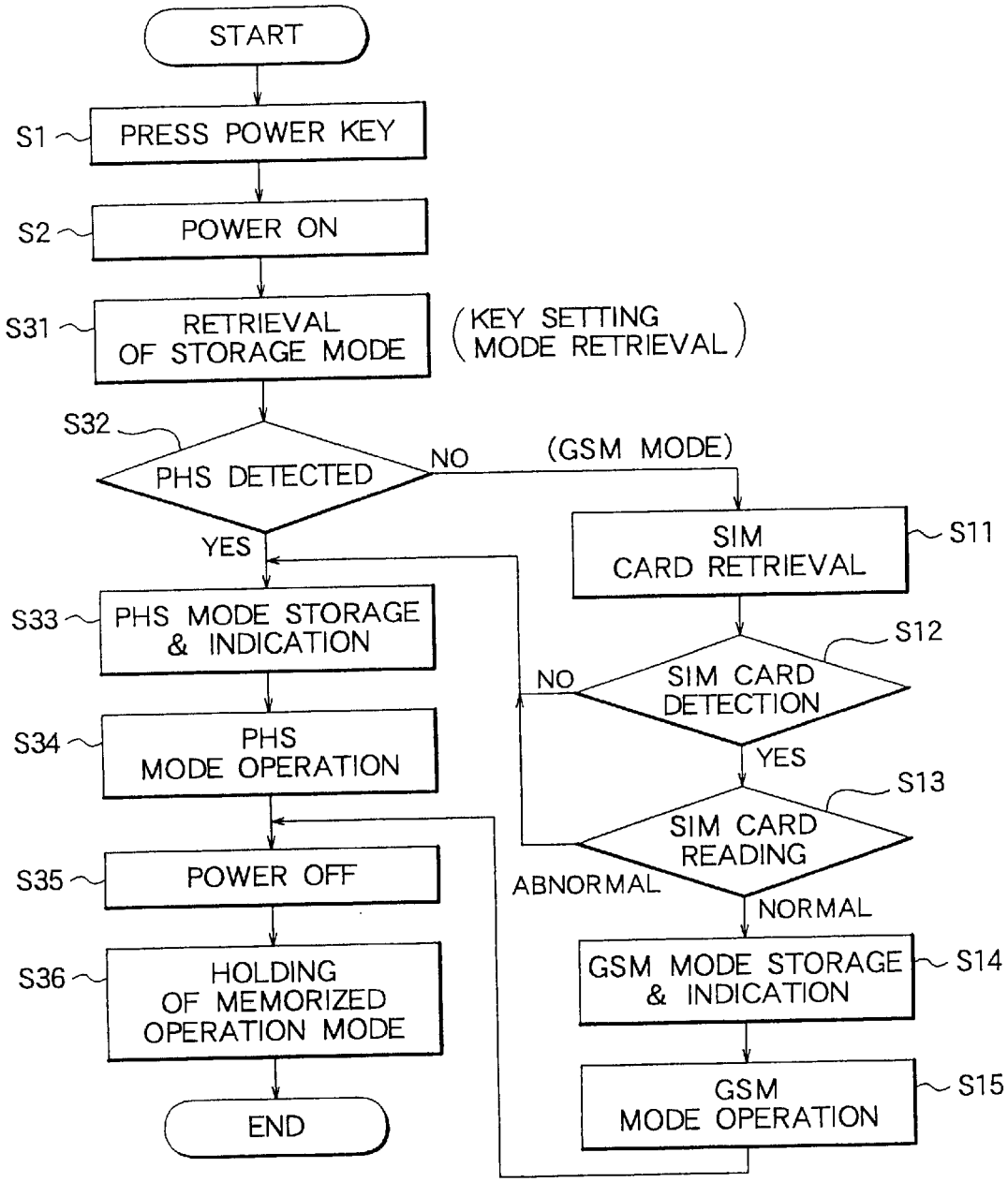
FIG. 4 is a flow chart showing an example of main operating procedure corresponding to FIG. 3.

Next, as shown in FIG. 4, if power is supplied, the power lamp 16 is turned ON and the common control unit 40 retrieves storage mode of the mode memory 13 by the mode detection circuit 42 (step S31).

A mode of a system activated last is memorized in the mode memory 13 and in the initial state, the PHS is set up. In the common control unit 40, if the PHS mode is detected (YES at step S32) as a result of detecting the mode memory 13 by the mode detection circuit 42, the PHS mode is overwritten on the mode memory 13 immediately by the mode setting circuit 43 and the mode lamp 17 is turned ON so as to indicate the PHS mode. Further, the PHS mode is indicated in characters on the character display 15 (step S33).

Next, the common control unit 40 communicates through the PHS radio unit 5 by an operation of the PHS mode (step S34) and when the communication is terminated so that the power key 10 is turned OFF (step S35), the PHS mode is held as an operation mode memorized at step S33 (step S36) and then the procedure is terminated.

If the above step S32 is "NO" and the GSM mode, not the PHS mode is selected, the common control unit 40 detects whether or not the SIM card 19 is mounted on the card mounting unit 9 by the SIM card retrieval circuit 41 (step S11).

If as a result of this detection, as described with reference to the above FIG. 2, it is detected that the SIM card 19 is mounted (YES at step S12). And the common control unit 40 is capable of reading storage data properly from the SIM card 19 (NORMAL at step S13). The GSM mode is overwritten on the mode memory 13 by the mode setting circuit to update the storage. And then the mode lamp 17 is kept unlit so as to indicate the GSM mode and further, the GSM mode is indicated in characters on the character display 15 (step S14).

The common control unit 40 communicates through the GSM radio unit 7 by an operation of the GSM mode (step S15). If the communication is terminated, the processing returns to step S35, in which the power key 10 is turned OFF. At step S36, the GSM mode which is an operating mode memorized at step S14 is held and the processing is terminated.

On the other hand, if the above step S12 is "NO" and it cannot be detected that the SIM card is mounted, or if the step S13 is "abnormal" and data cannot be read properly from the SIM card 19, the common control unit 40 proceeds to the step S33. In the step, the mode setting circuit 43 overwrites the PHS mode on the mode memory 13 instead of the GSM mode to update the storage and the mode lamp 17 is turned ON to indicate the PHS mode. Further, the PHS mode is indicated in characters on the character display 15 also. If data cannot be read properly in the above step S13, abnormality of the SIM card 19 can be further displayed in characters on the character display 15.

In the above case, the SIM card retrieval circuit of the common control unit detects a normal mounting of the card by receiving an electric signal from the card mounting unit. However, it is permissible to upon retrieval on the SIM card, proceed to a step for reading storage data of the SIM card immediately and determine that no SIM card is mounted if no storage data can be read. In this case, it cannot be discriminated which the reason why the reading of the storage data is disabled is due to no mounting of the SIM card, storage data missing in the SIM card or insertion of other card, and therefore no detailed indication is enabled.

Although in the above description, it has been stated that the operating mode is indicated with both the lamp and characters, at least if the mode change-over key is not provided, it is permissible to indicate with any one or not to indicate anything.

Although in the above description, the functional blocks and operating procedure have been stated with Figures, allocation of the functions or change of the operating procedure is free as long as the above functions are satisfied, and the above statement does not limit the present invention.

By combining the above described structure with a conventional structure and adding only the SIM card retrieval function of the common control unit, an easy-to-use dual band mobile phone can be obtained without inducing an increase of its size.

According to the present invention, as described above, there is an effect that the dual band mobile phone, having a system requiring the SIM card and a system not requiring the SIM card, can be used without making consciousness of whether or not the SIM card is mounted. The reason is that upon use, the mobile phone detects whether or not the SIM card is mounted and depending on whether or not the SIM card is mounted, the GSM mode or PHS mode can be automatically set up.

Further, according to the present invention, a mode memory for storing a system mode of any one of two systems is provided and the system is actuated by a system mode memorized in the mode memory when the power switch is turned ON. Therefore, a starting operation when the power is turned ON can be simplified.

Further, because the aforementioned mode memory holds in store a system mode being actuated when the power switch is turned OFF, in continuous calls, a new call is capable of preferentially selecting a system of the same condition as the last call, thereby enabling a stabilized communication. Further, by providing with a display unit for indicating an operating system mode by at least one of characters and a lamp, the operating system can be recognized.

What is claimed is:

1. A band selection method for a dual band mobile phone which includes both a first system requiring a SIM card and a second system not requiring the SIM card, said dual band mobile phone including a mode memory for memorizing a system mode of any one of said two systems, said method comprising the steps of:
supplying power to said first system;
detecting whether or not the SIM card is mounted while an operating mode is regarded as a system mode of said first system;
setting the operating mode to a system mode of the first system when the SIM card is detected;
supplying power to said second system;
setting the operating mode to a system mode of said second system if the SIM card is not detected;

supplying power to at least one of (a) said first system, and (b) said second system;

retrieving a system mode memorized in said mode memory;

retrieving said SIM card when a system mode of said first system is detected;

setting the operating mode to the system mode of said first system when the SIM card is detected;

wherein a system mode of any one of said two systems is memorized in said mode memory at an initial time, and if the power is cut off after the system mode is started, the operating system mode is memorized and held.

2. A dual band mobile phone comprising both a first system requiring a SIM card and a second system not requiring the SIM card, a card mounting unit for mounting said SIM card, a power switch for supplying a battery power to a predetermined circuit, a mode memory for memorizing any one system mode of said two systems and a common control unit, said common control unit including:

a mode detection circuit for detecting a system mode stored in said mode memory when said power switch is turned on;

a SIM card retrieval circuit for retrieving the SIM card at said card mounting unit when said mode detection circuit detects a system mode of said first system; and a mode setting circuit for setting an operating mode to a system mode of said first system when the SIM card retrieval circuit detects the SIM card, wherein said mode memory memorizes and holds a system mode of any one of said two systems at an initial time and memorizes and holds an operating system mode when the power switch is turned off after the system mode is started.

\* \* \* \* \*